Oct. 28, 1958   B. E. BOL RAAP   2,857,714
GLASS TUBE JOINT
Filed July 9, 1956
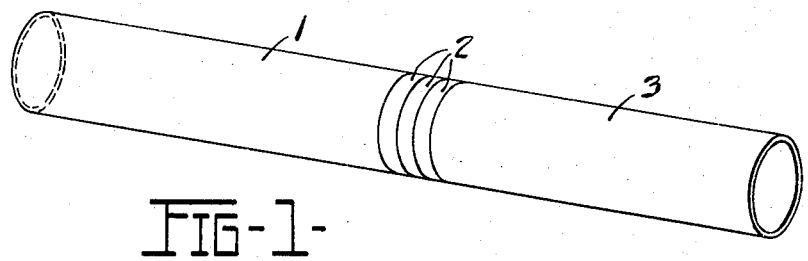
FIG-1-
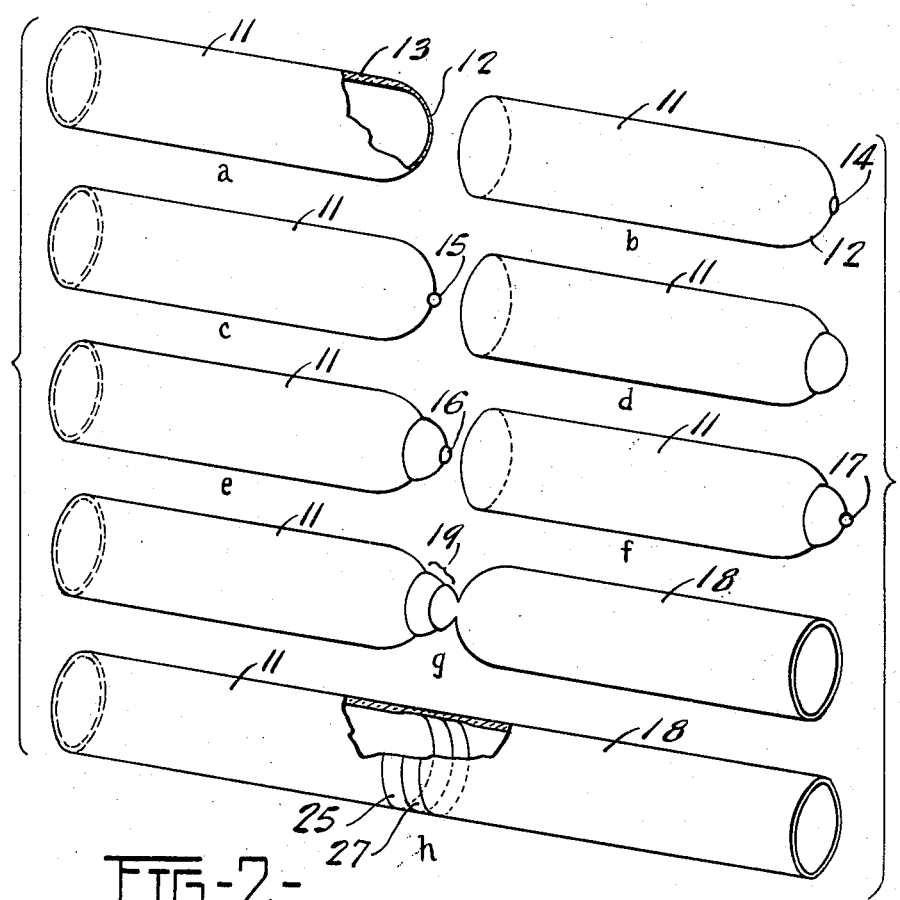
FIG-2-
INVENTOR:
BASTIAAN EVERARDUS BOL RAAP.
BY
ATTY.

2,857,714
GLASS TUBE JOINT

Bastiaan Everardus Bol Raap, Delft, Netherlands, assignor to Staatsbedrijf der Posterijen, Telegrafie en Telefonie, The Hague, Netherlands Application July 9, 1956, Serial No. 596,613

7 Claims. (Cl. 49—92)

This invention relates to a glass joint between two glass tubes differing in melting point and coefficient of expansion. More particularly, it deals with fusing the ends of the two tubes together by means of one or more different rings of transition glass having coefficients of expansion at practically equal intervals between the coefficients of expansion of said two tubes. For example, the joint of this invention includes joining a lower coefficient of expansion or higher melting point glass tube at an end of electron discharge tube to a higher coefficient of expansion or lower melting point glass tube connected to a vapor vacuum pump apparatus or the like, for producing a perfect gas tight seal for evacuating the electron discharge tube.

The application of this invention is a continuation-in-part application of the Bol Raap prior U. S. patent application Serial No. 300,936 filed July 25, 1952, and now abandoned.

Previously, such joints between two different glass tubes were produced by melting rods of different intermediate transition glasses around the end edges of one of the tubes to form annular rings of different transition glasses, and then joining the other tube to the ring formed by the last transition glass. In these methods at least four or five transition glasses were employed for one tube having about twice the coefficient of expansion of the others, which rings had walls of such thickness and width or length that they gave difficulty because they were easily affected and easily cracked at their joints when subjected to rapid changes in temperature.

It is an object of this invention to produce a fused glass joint between two tubes of different coefficients of expansion and different melting points.

Another object of this invention is to produce such a glass joint which has a favorable stress distribution and good temperature resistance, including resistance to relatively rapid changes in temperature.

Another object is to produce such a glass joint by means of relatively short transition glass sections in which only a relatively small amount of transition glass is employed.

Another object is to produce such a glass joint by means of transition glasses in which a fewer number of different transition glasses are employed than previously necessary for connecting two tubes of a given difference in coefficients of expansion.

Generally speaking, the joint of this invention comprises one or more relatively narrow transition glass rings between two glass tubes of different coefficients of expansion, and/or different melting points which rings have a wall thickness considerably less than that of the wall of either of the two glass tubes. Such thin glass transition rings are formed by first closing the ends of the two tubes to be joined together so that their closed ends have thin walls, next blowing in the center of each of these thin end walls small holes, attaching a small droplet of transition glass to the glass tube of lower coefficient of expansion or higher melting point then blowing a similar small hole in this droplet, repeating the last two steps for each further transition glass to be used, connecting the small holes in the last transition glass and in the glass of higher coefficient of expansion or lower melting point, and lastly blowing the connected small holes through said ends and droplets out into the desired outside diameter for the tube joint. The annular transition rings thus formed are narrow and of thicknesses considerably less than the thickness of the walls of either of said tubes because of the relative small size of the droplets employed. These thin walled fused transition glass rings or sections have considerably decreased internal tensions and stresses than those of thicker glass sections, and as a result the tensions which are produced in the thinner sections are much below the tensions normally permitted for making such glass joints, according to indications of a glass tension meter or of polarized light.

The above mentioned and other features and objects of this invention and the manner of attaining them are given more specific disclosure in the following description of an embodiment of this invention taken in conjunction with the accompanying drawing, wherein:

Fig. 1 is a perspective view of two glass tubes of different melting points joined together by three adjacent fused transition glass sections according to this invention;

Fig. 2 is a perspective composite view of various stages $a$ through $h$ in forming a glass joint similar to that shown in Fig. 1, but having only two transition glass sections.

Referring first to Fig. 1 there is shown a hard or tempered glass tube 1 that is one having a low coefficient of expansion or high melting point, which is connected by three different rings or sections 2 of transition glass to a normal or soft glass tube 3, that is one having a high coefficient of expansion or low melting point. For example, tube 1 may have a coefficient of expansion of about $50 \times 10^{-7}$ cm./° C., while that of the soft glass tube 3 may have a coefficient of expansion of $95 \times 10^{-7}$ cm./° C. or one-half that of the hard or tempered glass tube 1, and the transition glass sections 2 from the left to the right may have coefficients of expansion at substantial regular equal intermediate steps therebetween, say for example, of $60 \times 10^{-7}$, $73 \times 10^{-7}$, and $80 \times 10^{-7}$, respectively. However, it is also possible according to this invention to employ for such a joint only one transition glass section if the tubes to be joined are small, that is, less than about 20 millimeters in diameter. This one transition section may have, for example, a coefficient of expansion of about half way between that of the glass of the two tubes to be joined, that is, a coefficient of expansion of about $73 \times 10^{-7}$ cm./° C., because the wall of each transition glass section is only between about two-thirds and one-third, and preferably about one-half as thick as the regular wall of either tube 1 or tube 3. Thus, each adjacent transition glass section may have a greater difference in their coefficients of expansion, or between about from 20 to $30 \times 10^{-7}$ cm./° C., while previously it was necessary to maintain the adjacent transition section coefficients differing in an amount less than about one-third of this amount, or below about $15 \times 10^{-7}$ cm./° C. On the other hand, if more transition stages of lesser differences in expansion coefficients are employed, the tensions in the glass of the transition stages will be even less, and a still stronger joint which is even more resistant to temperature changes will be produced, and such is preferred for tubes of greater diameters than about 30 millimeters.

The glass tubes of this invention generally range between about 10 and 50 millimeters in diameter and the width of each transition glass or length of each transition section is usually about 1.3 millimeters, and has a thickness of about 0.8 millimeter, as compared to the thickness of the walls of the tubes being joined, which walls generally range between about 1.0 and 1.5 millimeters depending of course on the diameter of the glass tube.

Referring now to Fig. 2, the hard glass tube 11 (or the glass tube of higher melting point or lower coefficient of expansion) which is shown in stage a, is first closed at its end in a blow pipe of gas flame so as to appear as the semi-spherical bottom of a test tube, but this bottom 12 is made thinner than the side walls 13 of the tube 11 such as by pulling it out before it is closed. Next the tube 11 has a small hole 14 blown in the center of its thin closed end or bottom 12 as shown in stage b of Fig. 2. To this small hole 14, which is generally not more than 3 to 5 millimeters in diameter regardless of the size of the tube 11, there is placed a small solid droplet 15 of glass of the first transition section, as shown in stage c of Fig. 2. The diameter of this droplet 15, however, depends upon the diameter of the glass tube. For example, the smallest practical droplet diameters for different diameter tubes are given in the following Table A:

Table A

| Diameter of Glass Tube in millimeters | Thickness of Walls in millimeters | Diameter of Droplet in millimeters |
|---|---|---|
| 10 | 0.9–1.1 | 3.5–4 |
| 20 |  | 5 |
| 25 | 1.1–1.3 |  |
| 30 |  | 7 |
| 40 |  | 8 |
| 50 | 1.4–1.6 |  |

Although the thickness of the walls of the glass tubes to be joined may differ according to the diameter of tube, this is not a material factor in determining the size of the diameter of the droplet, since the walls of the tubes are first gradually thinned, as shown at the closed tube bottom 12 in Fig. 2, so that no sharp or abrupt difference in thickness between the transition rings 2 at the ends of the tubes will occur to produce additional internal stresses.

The droplet 15 may then be flattened somewhat into a disk, by blowing in the tube 11, such as shown in stage d of Fig. 2, and then a small hole 16 can easily be blown through the end of the flattened droplet (as shown in stage e), which corresponds to the hole 14 shown in stage b. To this hole 16 a droplet 17 of glass of the second transition section is fused, which is similar in size to the droplet 15, and this droplet 17 has a hole blown through it, similar to that shown at 16 in stage e.

Since only two transition stages are employed in Fig. 2, the hole made in the droplet 17 is then joined to a hole, similar to hole 14, formed in the thin end of the soft glass tube 18 (or the glass tube of lower melting point or high coefficient of expansion), which has already been prepared in a form similar to that shown in stage b. This hole in the soft glass tube 18 is then joined to the hole formed in the droplet 17 as shown in stage g of Fig. 2. Now the two tubes of hard, higher melting point or lower coefficient of expansion glass 11 and soft, lower melting point or higher coefficient of expansion glass 18 are fused together along a neck 19 formed by the perforated droplets of the transition glasses 15 and 17. This neck 19 shown in stage g is heated and blown out to correspond with a normal diameter of the tubes 11 and 18. The giving of the joint the correct outside tube diameter must only be done by blowing the neck 19 outwardly and not by also pulling the tubes 11 and 18 apart. The finished joint is shown in stage h of Fig. 2, which is also shown partly in section, to show that the thickness of the final transition sections 25 and 27 formed, respectively, from droplets 15 and 17, have a wall thickness much thinner than the normal wall thickness of either the hard glass tube 11 or that of the soft glass tube 18. The thickness of the walls 25 and 27 is usually between about 1.0 and 0.5 millimeter depending on the diameter of the tubes 11 and 18 (see Table A above). Also these transition glass sections 25 and 27 in Fig. 2h (or sections 2 in Fig. 1) are relatively narrow or short being usually not longer than about ⅛, and preferably about 1/10, the average diameter of the tubes being joined.

In carrying out this process, as shown in composite Fig. 2, it is desirable that the droplets 15 and 17 of transition glasses be added successively to the end of the harder, lower coefficient of expansion or higher melting point glass tube, in that it will be longer in the flame and will not be distorted as much by continued heat as would the end of the softer, lower melting point or higher coefficient of expansion glass tube.

An important material advantage of the present method is that it may be performed entirely in a blow torch flame without the requirement of any additional glass blower's tools. This also has a material advantage, in that none of the oxide particles which are usually present on the working ends of such additional tools can contaminate any of the fused glass transition sections to produce holes or weak spots in the final joint.

Although the tubes 1 and 3, or tubes 11 and 18, shown joined together in the drawings, are of substantially the same diameter and have substantially the same wall thickness, such need not be the case, in that similar joints can be made between two tubes having different diameters and/or different wall thicknesses within the ranges mentioned in Table A above, without departing from the scope of this invention. In such cases when different sized tubes are joined, the same steps as shown in Fig. 2 are followed through the neck 19 at joining stage g, then the neck may be blown out to form a truncated conical section of transition glasses which smoothly connects the ends of both of the two different sized tubes.

While there is described above the principles of this invention in connection with a specific method and apparatus, it is to be clearly understood that this description is made only by way of example and not as a limitation to the scope of this invention.

What is claimed is:

1. A fused glass joint between two glass tubes having different coefficients of expansion and melting points, said joint comprising at least one transition section glass, said section having a thinner wall than the normal wall of either of said two tubes and a length of less than about ⅛ the average diameter of said tubes.

2. A joint according to claim 1 wherein said two glass tubes have substantially the same outside diameter and substantially the same wall thickness.

3. A joint according to claim 1 where one of said tubes has a coefficient of expansion about twice that of the other.

4. A joint according to claim 1 wherein said transition sections of glass have coefficients of expansion at equal intermediate steps between that of said two tubes.

5. A joint according to claim 1 wherein the glass of said section has a difference in its coefficient of expansion to that of at one of the glasses to which it is fused of between about 20 and $30 \times 10^{-7}$ cm./° C.

6. A joint according to claim 1 wherein each of said transition sections of glass has a coefficient of expansion differing from that of the glasses to which it is fused by at least about $20 \times 10^{-7}$ cm./° C.

7. A joint according to claim 1 wherein the thickness of the walls of said joint is between about ⅓ and ⅔ the normal thickness of the walls of said tubes.

References Cited in the file of this patent

UNITED STATES PATENTS

| 1,748,587 | Smedley | Feb. 25, 1930 |
| 2,494,582 | Prokopec | Jan. 17, 1950 |
| 2,521,048 | Day | Sept. 5, 1950 |
| 2,522,523 | Lukes | Sept. 19, 1950 |